(12) United States Patent
Zhang et al.

(10) Patent No.: US 12,369,605 B2
(45) Date of Patent: Jul. 29, 2025

(54) COMPOSITE PREMIX COMPOSITION FOR IMPROVING MILK PRODUCTION OF LACTATING AND METHODS THEREOF

(71) Applicant: HUAQIAO UNIVERSITY, Quanzhou (CN)

(72) Inventors: Liangliang Zhang, Xiamen (CN); Jianchun Jiang, Xiamen (CN); Xiaoping Rao, Xiamen (CN); Liming Lu, Xiamen (CN); Kang Sun, Xiamen (CN); Kui Wang, Xiamen (CN); Jia Wang, Xiamen (CN)

(73) Assignee: HUAQIAO UNIVERSITY, Quanzhou (CN)

( * ) Notice: Subject to any disclaimer, the term of this patent is extended or adjusted under 35 U.S.C. 154(b) by 323 days.

(21) Appl. No.: 18/139,503

(22) Filed: Apr. 26, 2023

(65) Prior Publication Data
US 2024/0180200 A1    Jun. 6, 2024

(30) Foreign Application Priority Data
Dec. 2, 2022 (CN) .......................... 202211545481.5

(51) Int. Cl.
*A23K 10/30* (2016.01)
*A23K 20/158* (2016.01)
*A23K 20/174* (2016.01)
*A23K 20/20* (2016.01)
*A23K 50/10* (2016.01)

(52) U.S. Cl.
CPC ............ *A23K 10/30* (2016.05); *A23K 20/158* (2016.05); *A23K 20/174* (2016.05); *A23K 20/30* (2016.05); *A23K 50/10* (2016.05)

(58) Field of Classification Search
CPC .... A23K 10/30; A23K 20/158; A23K 20/174; A23K 20/30; A23K 50/10
USPC .......................................................... 426/2
See application file for complete search history.

(56) References Cited

FOREIGN PATENT DOCUMENTS

CN    107125441 A * 9/2017

OTHER PUBLICATIONS

Translation of CN-107125441-A (Year: 2017).*

* cited by examiner

*Primary Examiner* — Brent T O'Hern
(74) *Attorney, Agent, or Firm* — Cooper Legal Group, LLC

(57) ABSTRACT

A composite premix composition is prepared from tannic acid, *Litsea cubeba* essential oil (LEO), selenium, and vitamin E.

16 Claims, No Drawings

COMPOSITE PREMIX COMPOSITION FOR IMPROVING MILK PRODUCTION OF LACTATING AND METHODS THEREOF

RELATED APPLICATIONS

This application claims priority to Chinese patent application 202211545481.5, filed Dec. 2, 2022. Chinese patent application 202211545481.5 is incorporated herein by reference.

FIELD OF THE DISCLOSURE

The present disclosure relates to the technology field of livestock feed, and specifically relates to a composite premix composition for improving milk production of a lactating cow and methods thereof.

BACKGROUND OF THE DISCLOSURE

With rapid development of the animal husbandry industry, the feed industry in China is currently experiencing issues such as feed supply, environmental protection, and drug resistance and drug residues due to abuse in feed antibiotics. Research on alternative feed antibiotics has become a research hotspot and an urgent issue to be solved in the animal husbandry industry when high attention is focused on safety of animal husbandry products and achieving sustainable development of the animal husbandry industry. It is imperative for the animal husbandry industry to reduce and ban the feed antibiotics. However, with respect to the animal husbandry industry in China, an overall animal husbandry level is not high, development of the animal husbandry industry is not balanced, and a feeding management level, environmental health conditions, and facilities urgently of the animal husbandry industry need to be improved. These current situations have caused great difficulties for decreasing and/or replacing of the feed antibiotics in the animal husbandry industry and also become key issues that need to be urgently addressed in the current animal husbandry industry.

With development of the global economy and stimulation of increasing consumptive demands of people, production of meats, eggs, and milk in China continuously reaches new highs in recent years. However, fluctuations and variations in the animal husbandry industry have also seriously affected development of the cow husbandry industry, especially scientific feeding of lactating cows. One of biggest problems of cow culturist personnel is that milk production of lactating cows needs to be improved to enable profitability of cow land to be improved under the premise that health of the cows is ensured. There are many products available from scientific research in recent years and products launched by increasing milk production of the lactating cow. However, there are issues with unclear actual effects and high costs.

BRIEF SUMMARY OF THE DISCLOSURE

An objective of the present disclosure is to provide a composite premix composition for improving milk production of a lactating cow and methods thereof to overcome deficiencies of the existing techniques.

A technical solution of the present disclosure is as follows:

A composite premix composition, the composite premix composition is prepared from tannic acid, *Litsea cubeba* essential oil (LEO), selenium, and vitamin E, a mass ratio of the tannic acid and the LEO is 50-90:10-50, a mass of the tannic acid is not less than a mass of the LEO, an amount of the selenium is 0.01-0.03 wt % of a total amount of the tannic acid and the LEO, and an amount of the vitamin E is 0.04-0.06 wt % of the total amount of the tannic acid and the LEO.

In a preferred embodiment of the present disclosure, the mass ratio of the tannic acid to the LEO is 5-9:1.

In a preferred embodiment of the present disclosure, the amount of the selenium is 0.02 wt % of the total amount of the tannic acid and the LEO, and the amount of the vitamin E is 0.05 wt % of the total amount of the tannic acid and the LEO.

In a preferred embodiment of the present disclosure, the tannic acid is extracted from gallnut, tara, chestnut, quebracho, or valonia by hot water.

A method for preparing a composite premix composition for improving a milk production of a lactating cow comprises preparing the composite premix composition from tannic acid, LEO, selenium, and vitamin E, wherein a mass ratio of the tannic acid and the LEO is 50-90:10-50, a mass of the tannic acid is not less than a mass of the LEO, an amount of the selenium is 0.01-0.03 wt % of a total amount of the tannic acid and the LEO, and an amount of the vitamin E is 0.04-0.06 wt % of the total amount of the tannic acid and the LEO.

In a preferred embodiment of the present disclosure, the mass ratio of the tannic acid to the LEO is 5-9:1.

In a preferred embodiment of the present disclosure, the amount of the selenium is 0.02 wt % of the total amount of the tannic acid and the LEO, and the amount of the vitamin E is 0.05 wt % of the total amount of the tannic acid and the LEO.

In a preferred embodiment of the present disclosure, the tannic acid is extracted from gallnut, tara, chestnut, quebracho, or valonia by hot water.

In a preferred embodiment of the present disclosure, a dose of the composite premix composition is 55-65 g/day/cow.

In a preferred embodiment of the present disclosure, the preparing the composite premix composition comprises:
(1) mixing the selenium, the vitamin E, and the tannic acid to be even to obtain a first mixture;
(2) mixing the first mixture with the LEO to be even to obtain a second mixture; and
(3) sieving the second mixture to obtain the composite premix composition.

The present disclosure has the following advantages.

A use of a compound extract having the tannic acid and the LEO can reduce a diarrhea attack rate of a cow, improve an absorption and utilization of nutrients in the intestinal tract, regulate endocrinology of lactation, and improve milk secretion of breast cells. When the composite premix composition of the present disclosure is added into daily feeds of the lactating cow, the diarrhea attack rate of the lactating cow is obviously reduced, a milk production of the lactating cow is improved, and a profitability of cow land is improved.

DETAILED DESCRIPTION OF THE EMBODIMENTS

The technical solution of the present disclosure will be further described below through the accompanying embodiments.

In the following embodiments, tannic acid is provided by Zhejiang Fuyou Bio-tech Co., Ltd, *Litsea cubeba* essential oil (LEO) is provided by the Institute of Chemical Industry of Forest Products, Chinese Academy of Forestry, selenium is provided by Lallemand Inc., Canada, and vitamin E is provided by Zhejiang NHU Co., Ltd.

Embodiment 1

(1) The tannic acid (which is extracted from quebracho by hot water), the LEO, the selenium, and the vitamin E are weighed according to the following mass ratio: a mass ratio of the tannic acid to the LEO is 90:10, an amount of the selenium is 0.02 wt % of a total amount of the tannic acid and the LEO, and an amount of the vitamin E is 0.05 wt % of the total amount of the tannic acid and the LEO;

(2) The selenium, the vitamin E, and the tannic acid are mixed to be even to obtain a first mixture;

(3) The first mixture and the LEO are mixed to be even to obtain a second mixture; and (4) The second mixture is sieved through a 40 mesh sieve to obtain a composite premix composition.

An experiment using the composite premix composition prepared in this embodiment is performed at cow land in Bayannur City, Inner Mongolia Autonomous Region. 125 cows in a first group are selected as an experimental group, and 114 cows in a second group are selected as a control group. Management and environmental health conditions of the cow land are good, and cows are in a healthy state.

A specified setting of the experiment is as follows: in the experimental group, the composite premix composition with a dose of 60 g/day/cow is added into fine feeds to be expanded, stirred, then added into feeds, stirred to be even, and each cow is fed every day. The control group is normally fed. Feeding managements and environmental conditions of the experiment group and the control group are consistent with those of the cow land, and the cows in the experiment group and the control group are free to feed and drink and are raised and immunized according to routine feeding procedures and immunization procedures. The cows do not use any medicine during an experimental period, and the experimental period is 30 days. A conditioning period before a beginning of the experimental period is 7-15 days. Feeds used in the cow land are used in the experiment and are divided into a breakfast and a lunch. Daily feed intakes, milk productions, etc., are recorded.

Results of the experiment are as follows: milk production of the experimental group increases by an average of 1.5-2 kg per cow per day compared to milk production of the control group. With respect to milk compositions, the contents of fat, protein, and dry matter in the experimental group increased by 10.3%, 25.0%, and 21.5% compared to the control group respectively. The experiment in the present disclosure shows that a diarrhea attack rate decreases, milk production of the lactating cows (see Table 1) increases, and milk quality (see Table 2) increases.

TABLE 1

Influence on a production performance of the lactating cows

| | Average milk production (kg/cow) | | | | | | | | | |
|---|---|---|---|---|---|---|---|---|---|---|
| Feeding days | 0 | 1 | 2 | 3 | 4 | 5 | 6 | 7 | 8 | 9 |
| Experimental group | 27 | 27 | 26 | 27 | 26 | 27 | 27 | 27 | 26 | 27 |
| Control group | 26 | 27 | 26 | 26 | 26 | 26 | 26 | 26 | 26 | 26 |

TABLE 1-continued

Influence on a production performance of the lactating cows

| | Average milk production (kg/cow) | | | | | | | | | |
|---|---|---|---|---|---|---|---|---|---|---|
| Feeding days | 10 | 11 | 12 | 13 | 14 | 15 | 16 | 17 | 18 | 19 |
| Experimental group | 26 | 26 | 26 | 26 | 26 | 26 | 26 | 27 | 26 | 26 |
| Control group | 26 | 26 | 27 | 26 | 25 | 26 | 25 | 25 | 25 | 25 |

| | Average milk production (kg/cow) | | | | | | | | | |
|---|---|---|---|---|---|---|---|---|---|---|
| Feeding days | 20 | 21 | 22 | 23 | 24 | 25 | 26 | 27 | 28 | 29 |
| Experimental group | 26 | 27 | 26 | 26 | 26 | 26 | 26 | 26 | 26 | 26 |
| Control group | 25 | 25 | 25 | 24 | 25 | 25 | 25 | 25 | 25 | 25 |

TABLE 2

Effects of Embodiment 1 on milk production quality of the lactating cows

| | Content (%) | |
|---|---|---|
| Composition | Experimental group | Control group |
| Fat | 4.3 | 3.9 |
| Dry matter (DM) | 9.6 | 7.9 |
| Density | 32.9 | 26.6 |
| Protein | 3.5 | 2.8 |
| Lactose | 5.3 | 4.3 |
| Inorganic salt | 0.7 | 0.6 |

Embodiment 2

(1) Tannic acid (which is extracted from chestnut by hot water), LEO, selenium, and vitamin E are weighted according to the following mass ratio: a mass ratio of the tannic acid to the LEO is 50:50, an amount of the selenium is 0.02 wt % of a total amount of the tannic acid and the LEO, and an amount of the vitamin E is 0.05 wt % of the total amount of the tannic acid and the LEO;

(2) The selenium, the vitamin E, and the tannic acid are mixed to even to obtain a first mixture;

(3) The first mixture and the LEO are mixed to even to obtain a second mixture;

(4) The second mixture is sieved through a 40 mesh sieve to obtain a composite premix composition.

An experiment using the composite premix composition prepared in this embodiment is performed on cow land in Bayannur City, Inner Mongolia Autonomous Region, and a process and feeding of the experiment is the same as Embodiment 1. A specified cow selection for the experiment is as follows: 120 cows in a first group are selected as an experimental group, and 110 cows in a second group are selected as a control group. Management and environmental health conditions of the cow land are good, and cows are in a healthy state. Results of the experiment are shown in Table 3.

TABLE 3

Influence on a production performance of lactating cows

|  | Control group | Experimental group |
|---|---|---|
| Dry matter (DM) feed intake/cow/day kg | 20.5 | 20.7 |
| Average milk production/ cow/day kg | 25.6 | 27.1 |
| Protein % | 2.8 | 3.3 |
| Fat % | 3.9 | 4.2 |
| Dry matter % | 7.8 | 9.4 |

After comparative experiments, it can be seen from Table 3 that feed intakes of the lactating cows remain unchanged when the composite premix composition in this embodiment is added into daily feeds of the lactating cows, while the average milk production of the lactating cows increases by 1.5 kg. Contents of the fat, the protein, and the dry matter in the experimental group respectively increase by 7.7%, 17.9%, and 20.5% compared to the control group. Economic benefits of the cow land significantly increase.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. A composite premix composition, wherein:
   the composite premix composition is prepared from tannic acid, *Litsea cubeba* essential oil (LEO), selenium, and vitamin E,
   a mass ratio of the tannic acid and the LEO is 50-90:10-50,
   an amount of the selenium is 0.01-0.03 wt % of a total amount of the tannic acid and the LEO, and
   an amount of the vitamin E is 0.04-0.06 wt % of the total amount of the tannic acid and the LEO.

2. The composite premix composition according to claim 1, wherein the mass ratio of the tannic acid to the LEO is 5-9:1.

3. The composite premix composition according to claim 2, wherein:
   the amount of the selenium is 0.02 wt % of the total amount of the tannic acid and the LEO, and
   the amount of the vitamin E is 0.05 wt % of the total amount of the tannic acid and the LEO.

4. The composite premix composition according to claim 1, wherein the tannic acid is extracted from gallnut, tara, chestnut, quebracho, or valonia by water.

5. A method for preparing a composite premix composition for improving a milk production of a lactating cow, comprising:
   preparing the composite premix composition from tannic acid, *Litsea cubeba* essential oil (LEO), selenium, and vitamin E, wherein:
   a mass ratio of the tannic acid and the LEO is 50-90:10-50,
   an amount of the selenium is 0.01-0.03 wt % of a total amount of the tannic acid and the LEO, and
   an amount of the vitamin E is 0.04-0.06 wt % of the total amount of the tannic acid and the LEO.

6. The method according to claim 5, wherein the mass ratio of the tannic acid to the LEO is 5-9:1.

7. The method according to claim 6, wherein:
   the amount of the selenium is 0.02 wt % of the total amount of the tannic acid and the LEO, and
   the amount of the vitamin E is 0.05 wt % of the total amount of the tannic acid and the LEO.

8. The method according to claim 5, wherein:
   the tannic acid is extracted from gallnut, tara, chestnut, quebracho, or valonia by water.

9. The method according to claim 5, wherein the preparing the composite premix composition comprises:
   (1) mixing the selenium, the vitamin E, and the tannic acid to obtain a first mixture;
   (2) mixing the first mixture with the LEO to obtain a second mixture; and
   (3) sieving the second mixture to obtain the composite premix composition.

10. The method according to claim 6, wherein the preparing the composite premix composition comprises:
    (1) mixing the selenium, the vitamin E, and the tannic acid to obtain a first mixture;
    (2) mixing the first mixture with the LEO to obtain a second mixture; and
    (3) sieving the second mixture to obtain the composite premix composition.

11. The method according to claim 7, wherein the preparing the composite premix composition comprises:
    (1) mixing the selenium, the vitamin E, and the tannic acid to obtain a first mixture;
    (2) mixing the first mixture with the LEO to obtain a second mixture; and
    (3) sieving the second mixture to obtain the composite premix composition.

12. The method according to claim 8, wherein the preparing the composite premix composition comprises:
    (1) mixing the selenium, the vitamin E, and the tannic acid to obtain a first mixture;
    (2) mixing the first mixture with the LEO to obtain a second mixture; and
    (3) sieving the second mixture to obtain the composite premix composition.

13. A method for improving milk production of a lactating cow using the composite premix composition according to claim 1, wherein a dose of the composite premix composition is 55-65 g/day/cow.

14. A method for improving milk production of a lactating cow using the composite premix composition according to claim 2, wherein a dose of the composite premix composition is 55-65 g/day/cow.

15. A method for improving milk production of a lactating cow using the composite premix composition according to claim 3, wherein a dose of the composite premix composition is 55-65 g/day/cow.

16. A method for improving milk production of a lactating cow using the composite premix composition according to claim 4, wherein a dose of the composite premix composition is 55-65 g/day/cow.

* * * * *